United States Patent

[11] 3,630,336

[72] Inventors Carl F. Johnson; William R. McCray, both of Lexington, Ky.
[21] Appl. No. 28,816
[22] Filed Apr. 15, 1970
[45] Patented Dec. 28, 1971
[73] Assignee International Business Machines Corporation Armonk, N.Y.

[54] PROPORTIONAL SPACING PRINTER INCORPORATING WORD UNDERSCORE CONTROL
6 Claims, 9 Drawing Figs.

[52] U.S. Cl. .................... 197/113, 197/19, 197/84 B
[51] Int. Cl. .................... B41j 29/26
[50] Field of Search .................... 197/19, 20, 82, 84, 84 A, 84 B, 91, 98, 90, 113; 199/1, 18

[56] References Cited

UNITED STATES PATENTS

| | | | |
|---|---|---|---|
| 2,093,581 | 9/1937 | Thompson | 197/20 |
| 2,800,213 | 7/1957 | Young | 197/113 |
| 3,036,686 | 5/1962 | Bacher | 197/113 |
| 3,207,845 | 9/1965 | Swenson | 199/1 X |
| 3,208,041 | 9/1965 | Swenson | 199/1 X |
| 3,278,003 | 10/1965 | O'Brien et al. | 199/18 |
| 3,294,956 | 12/1966 | Jenkins et al. | 197/19 X |
| 3,311,211 | 3/1967 | Schaefer | 197/98 |
| 3,509,982 | 5/1970 | Palmer | 197/113 |
| 3,512,137 | 5/1970 | Jones et al. | 197/84 |

*Primary Examiner*—Ernest T. Wright, Jr.
*Attorneys*—Hanifin and Jancin and John W. Girvin, Jr.

ABSTRACT: A proportional spacing typewriting system incorporating electronic logic to control forward and reverse printer escapement in accordance with the width of characters printed. A secondary medium is utilized to record keyed characters and also to control printing. Printer backspacing is effected by reading a previously recorded character from the secondary medium corresponding to the character representation immediately preceding the print point in order to determine the escapement value of that character and thereafter by controlling the reverse escapement of the printer by a corresponding amount. Word underscore control logic recognizes interword characters and causes the printer to reverse escape over a complete word so that underscore characters can thereafter be printed under the previously printed characters of the word. The control logic insures that the underscore characters so printed properly align with the rightmost portion of the last character of the underscored word by causing the printer to backspace a proper amount immediately prior to printing the last underscore character. A special word underscore code is recorded on the secondary medium when the keyed characters are recorded. The code can thereafter be recognized on subsequent playout to effect word underscore operations. Additional logic recognizes sequences of backspace codes and underscore codes on the medium as a word underscore operation during playout. Special error control circuits facilitate operator control and understanding of system operations.

*INVENTORS*
CARL F. JOHNSON
WILLIAM R. McCRAY

*BY* John W Girvin, Jr

*ATTORNEY*

PROPORTIONAL SPACING PRINTER INCORPORATING WORD UNDERSCORE CONTROL

CROSS REFERENCE TO RELATED APPLICATIONS

The following applications are assigned to the same assignee as the present application:

U.S. Pat. Application Ser. No. 886,798 entitled "Data System with Printing, Composing, Communications and Magnetic Card Processing Facilities," Robert A. Kolpek, inventor, filed Dec. 19, 1969, as a continuation of application Ser. No. 802,700 filed Sept. 6, 1968, now abandoned.

U.S. Pat. Application Ser. No. 697,735 entitled "Data Reading, Recording, and Positioning System," Douglas E. Clancy et al. inventors, filed Jan. 15, 1968 now U.S. Pat. No 3,530,448.

BACKGROUND OF THE INVENTION

1. Field

This invention relates to a proportional spacing typewriting machine and more particularly to an improved proportional spacing typewriting machine having facilities therein to automatically effect underscoring of complete words of text characters.

2. Description of the Prior Art

Proportional spacing typewriter machines are well known in the art. These machines are generally manually operated and have facilities therein to effect backspacing by a selected amount of escapement. Thus, when the operator of such a machine desires to underscore proportionally spaced previously printed words, the operator must carefully backspace the printer by an amount corresponding to the space occupied by the previously printed word. A reposition indicator is often utilized to insure correct alignment. Thereafter, the operator keys underscore characters under the previously printed word. The operator must again carefully align the last underscore character to be printed with the last character of the word so that the underscore character does not occupy the white space between words. The operation of such a typewriting machine is a tedious task for skilled operators and requires a great deal of calculation and alignment prior to exactly underscoring a previously printed word.

Various powered typewriters which operate in response to both operator keying and control codes located on a secondary medium such as magnetic tape or paper tape are known in the art. These devices generally utilize standard spacing printers and can effect word underscoring by supplying an amount of backspace codes equal to the number of characters in the word and thereafter supplying a corresponding number of underscore codes to effect underscoring of the word. Since such systems do not utilize proportionally spaced printed characters, it is unneccessary to calculate and detect where the word beginning is located in terms of the present print point since this information is supplied by the number of character codes comprising the word. While such prior art systems operate effectively to underscore words of information in a semiautomatic manner, they do not incorporate proportional spacing printing and they require the operator to key the proper number of backspace codes.

SUMMARY OF THE INVENTION

In order to overcome the above-noted shortcomings of the prior art devices, the present invention relates to a proportional spacing typewriting system which is responsive to keyed codes and to codes sensed on a secondary medium to automatically effect the underscoring of words of proportionally spaced printed characters. The system operates when in a record mode to print each character keyed from the keyboard and to record a coded representation of that character onto a secondary medium. When the operator depresses a special word underscore key located on the keyboard, the printer automatically backspaces over the last printed word and thereafter automatically prints underscore characters under the word. The underscore characters are aligned by the system with the word and do not project into the white space located on either side of the word. Additionally, a special word underscore code is recorded on the secondary medium. When the system is in playout mode, coded characters located on the secondary medium are sensed and printing is automatically effected. When a special word underscore code is sensed, the printer is backspaced and underscore characters are printed under the last word printed as in the record mode. Additional control logic recognizes sequences of backspace codes and underscore codes to effect a word underscore operation. Special error control circuits are utilized to lock out indications of errors that would be confusing to the machine operator and to approximate the underscoring operation when certain codes cannot be detected from the secondary medium. The utilization of the word underscore operation removes any calculation or positioning operation from the machine operator thereby greatly reducing problems previously encountered with the underscoring of words on a proportional spacing typewriting machine.The foregoing and other features and advantages of the invention will be apparent from the following more particular description of the preferred embodiment of the invention as illustrated in the accompanying drawing:

Figure 4:
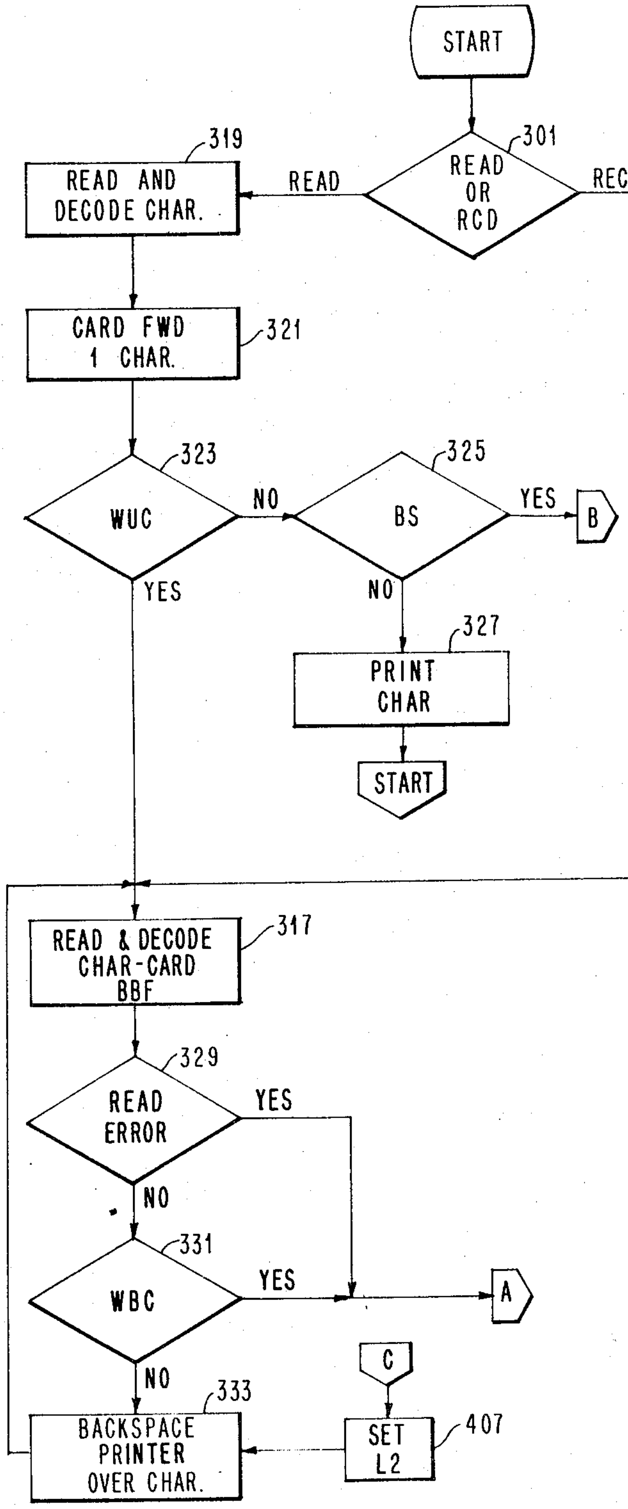
Figure 5:
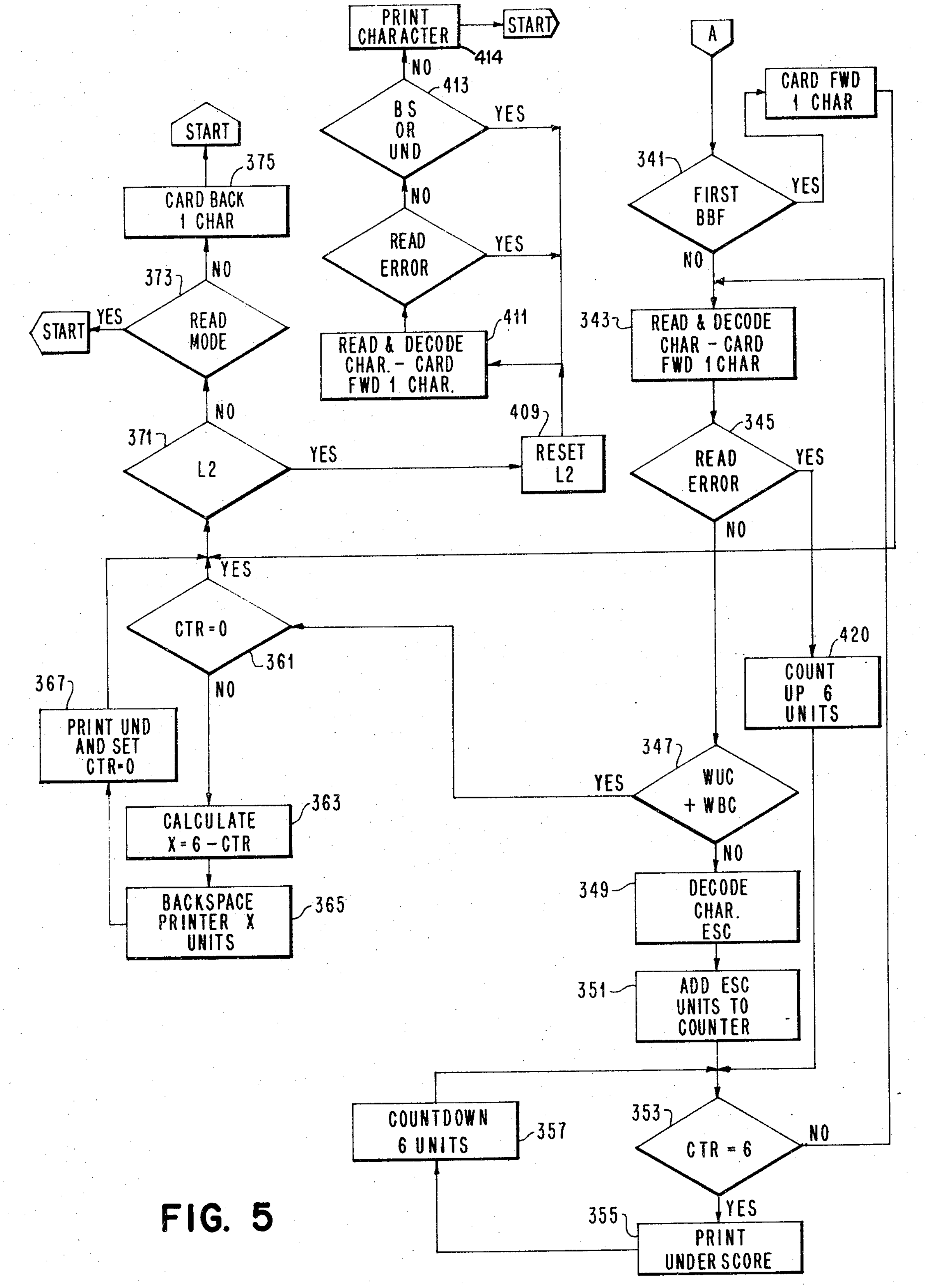
Figure 6:
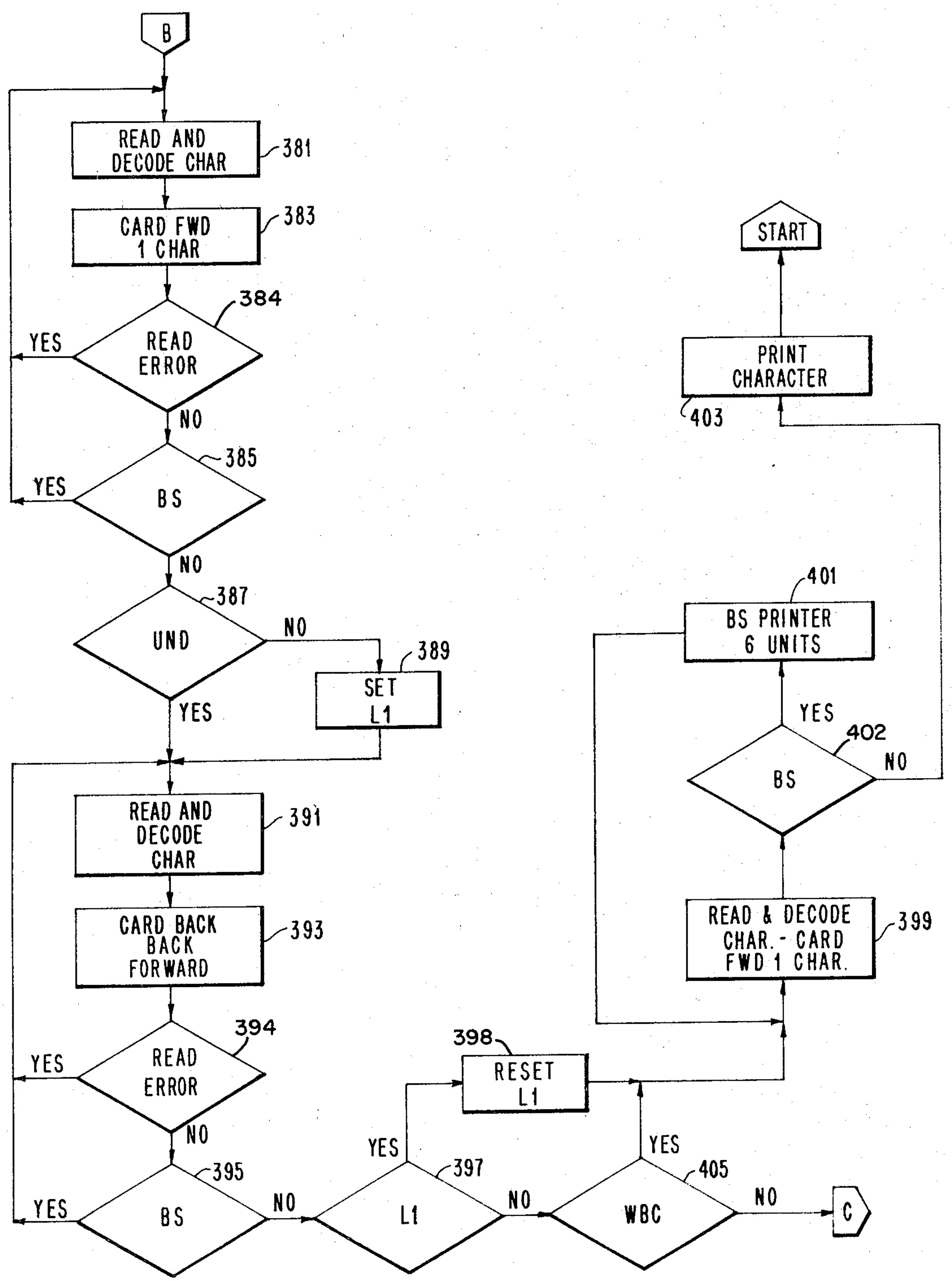

FIGS. 4,5, and 6 are flow diagrams of the word underscore control system logic.

Figure 7:
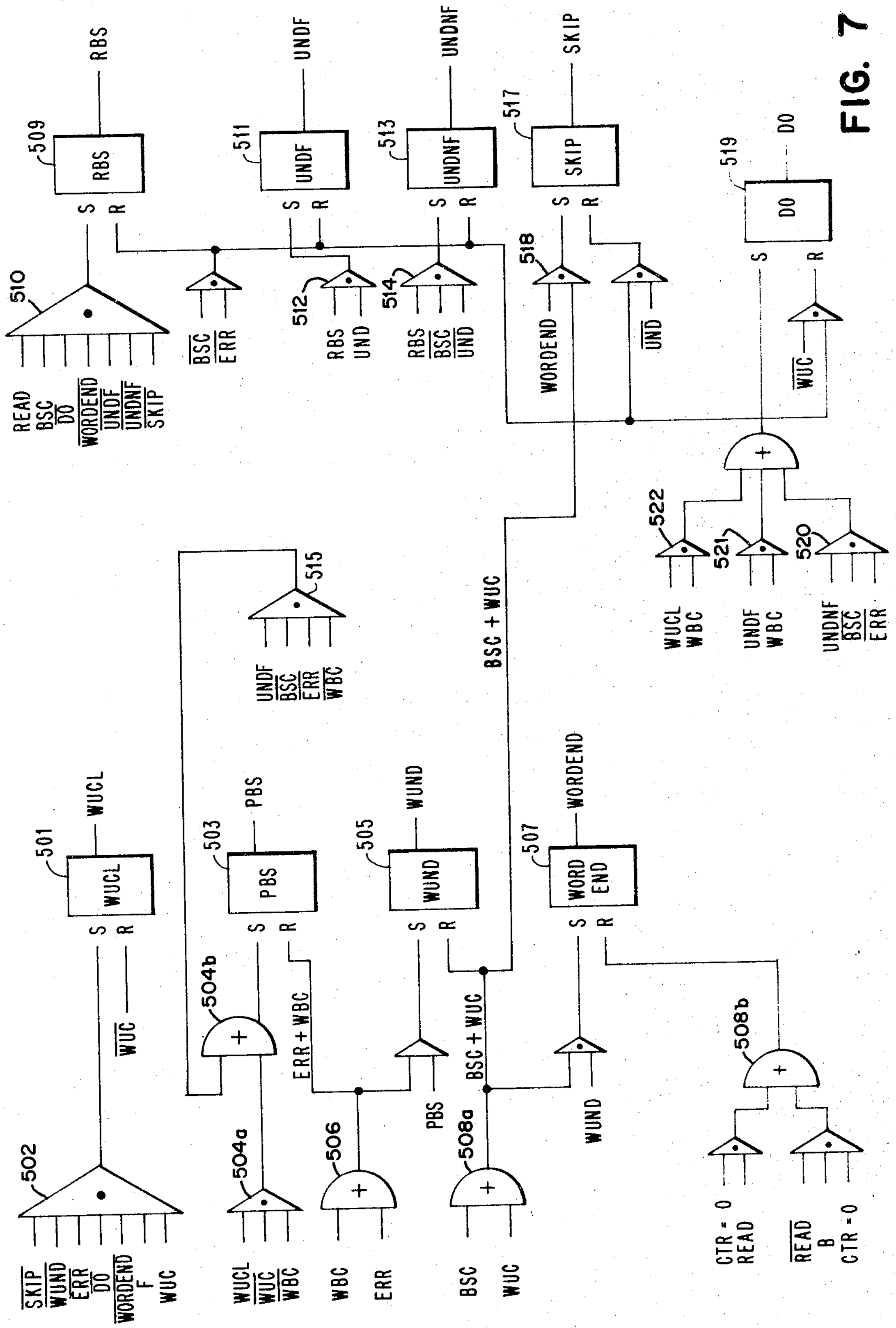
Figure 8:
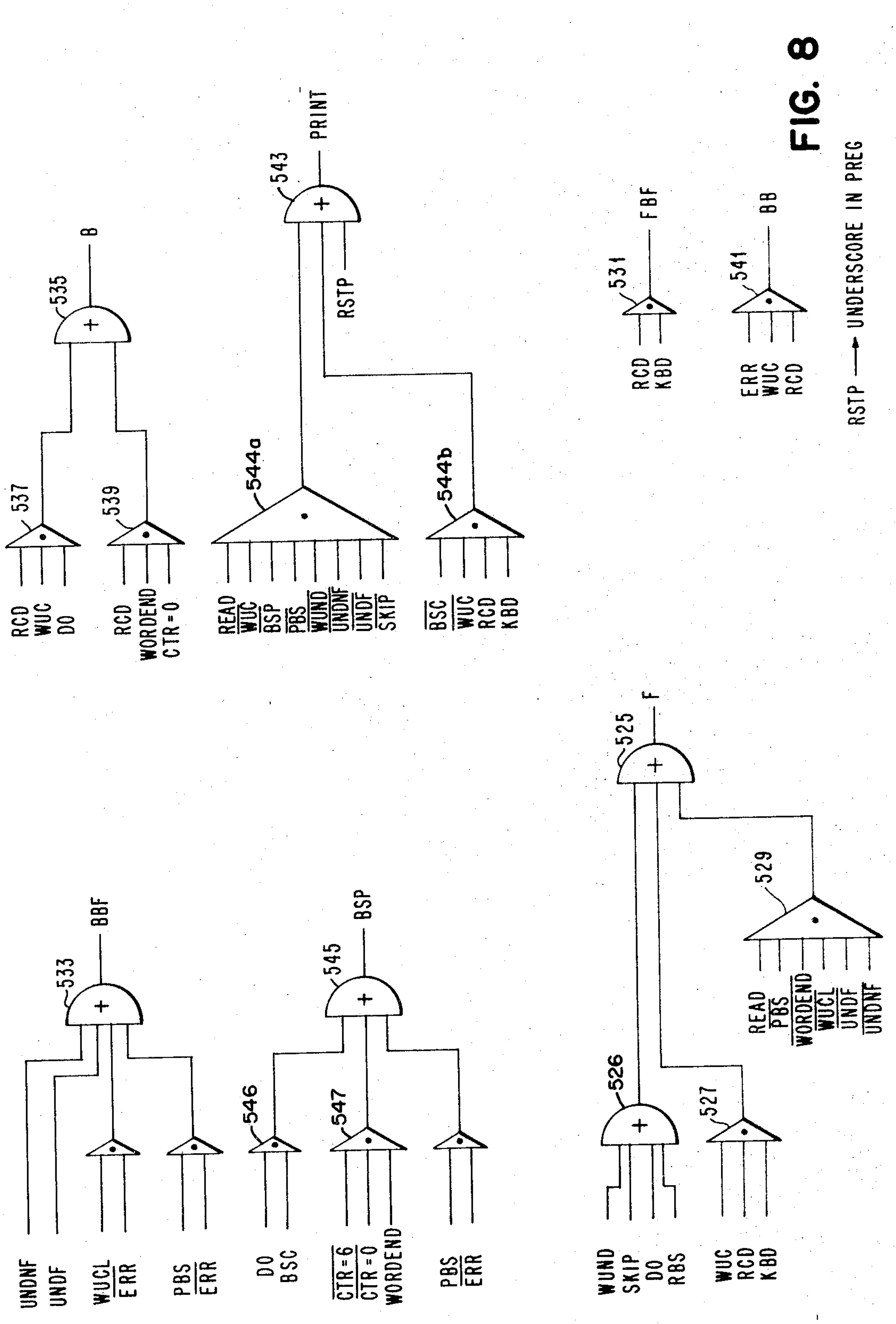
Figure 9:
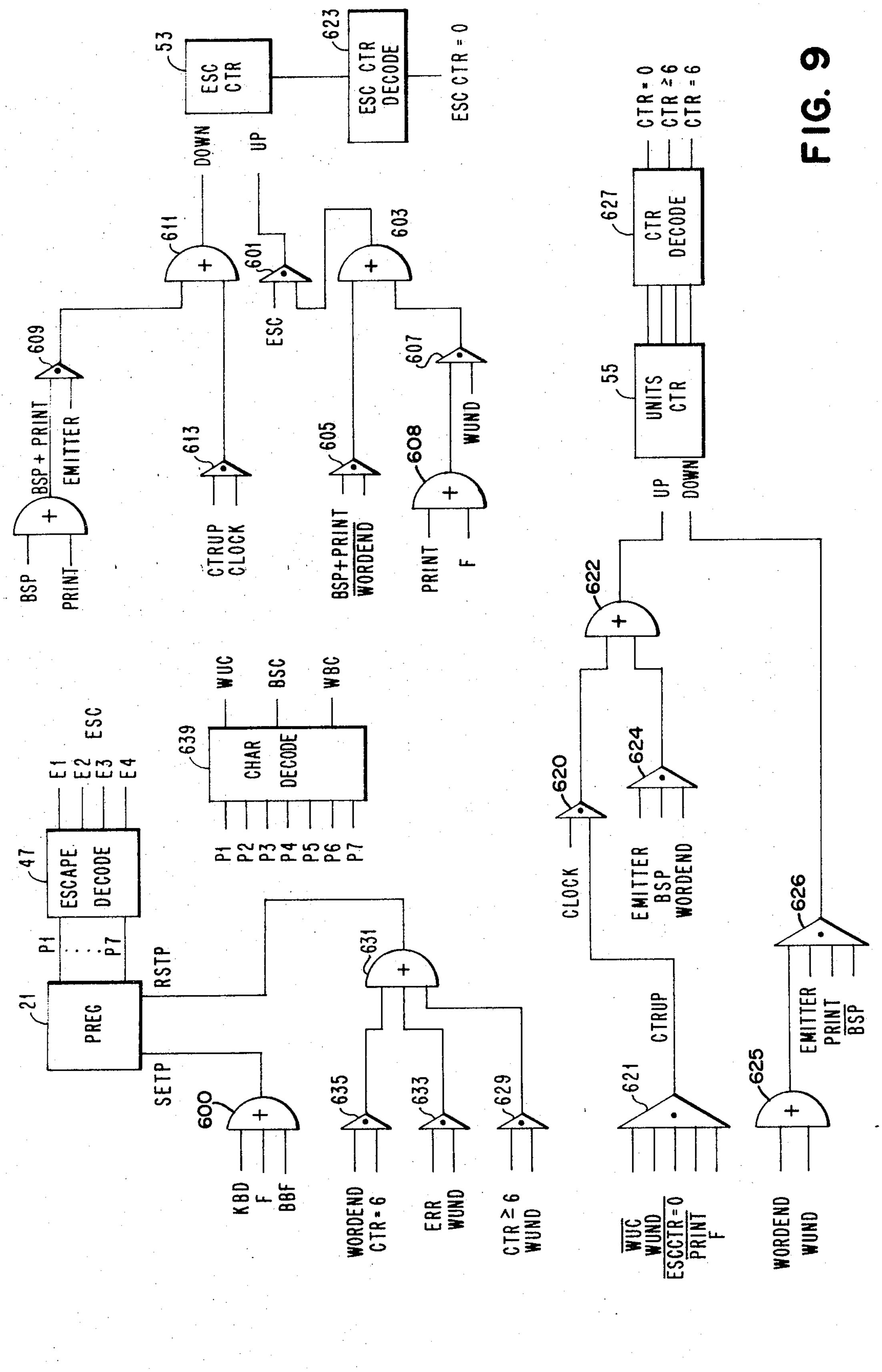

FIGS. 7, 8, and 9 are schematic block diagram representations of the word underscore control logic of the system.

GENERAL DESCRIPTION

Figure 1:
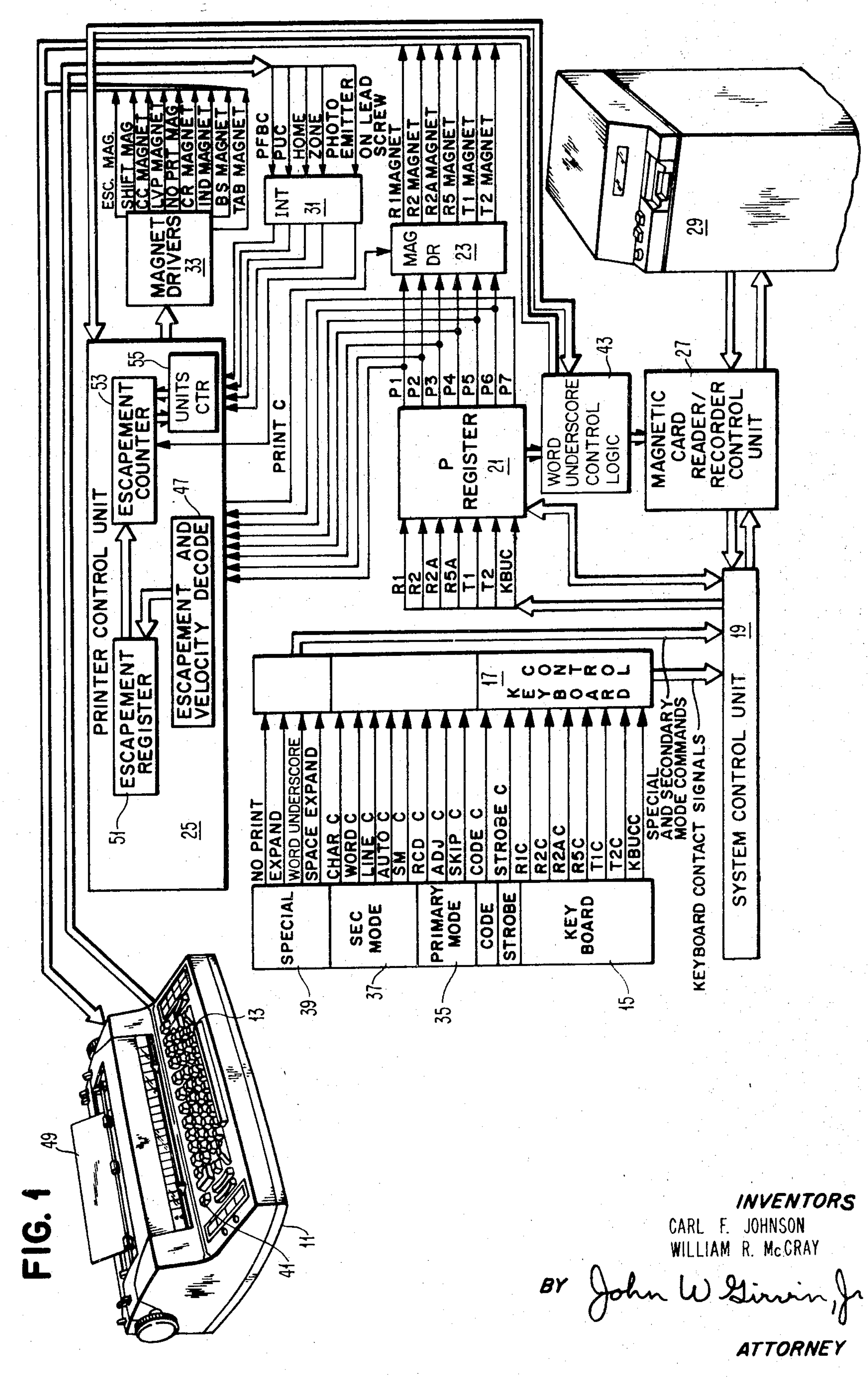
FIG. 1 is an overall system block diagram of the proportional spacing printer system incorporating word underscore control.

Referring now to FIG. 1 of the drawing, an overall system block diagram of the proportional spacing printer system incorporating the word underscore control of the present invention is depicted. The system consists of a proportional spacing printer 11 having a keyboard 13 associated therewith. The keyboard 13 and printer 11 appear as a conventional typewriter unit except that there is no mechanical connection between the keyboard 13 and the printer 11. Letters keyed on the character keys activate keyboard switches 15 which in turn supply electrical signals to the keyboard control 17. The system control unit 19, thereafter effects the gating of the coded signals from the keyboard control 17 representing the depressed character key to the P register 21. The coded representation of the character keyed is thereafter transferred to the magnet driver unit 23 which effects selection of the desired character. Additionally, the coded representation located in the P register 21 is transferred to the printer control unit 25 which controls the print cycle and detects the escapement width value of the character printed to control the escapement of the printer 11 by a corresponding amount.

Character codes which are thus entered into the system are also transferred from the P register 21 to the magnetic card reader recorder control unit 27 under the control of the system control unit 19. Characters thus transferred to the magnetic card reader recorder control unit 27 are thereafter recorded on a magnetic card medium located within the magnetic card reader recorder unit 29. When in play mode, characters are sensed from the magnetic card medium 207 of FIG. 3, located in the magnetic card reader recorder unit 29 and transferred under the control of the system control unit 19 and the magnetic card reader recorder control unit 27 to the P register 21. Thereafter the character code representation located in the P register 21 is used to energize the magnet drivers 23 which in turn effect selection of the sensed character. As will be described hereinafter, signal from the printer 11 indicates when the printer 11 has spaced or escaped the proper distance for a previously printed character. This signal is supplied to the integrator unit 31 and is thereafter transferred to the printer control unit 25. The printer control unit 25 then supplies a signal to the magnet driver unit 33 which controls the print cycle and escapement of the printer 11.

The operator selects the primary mode, (record, play, adjust, or skip) in which the system will operate by depressing a control keybutton. Depression of the control keybutton transfers contacts of the primary mode switches 35 which provide a signal to the system control unit 19. Depression of additional control keybuttons on the keyboard 13 transfers secondary mode switches 37 which indicate to the system control unit 19 that a single character is to be played, a word of characters is to be played, a line of characters is to be played, or that playout is to continue until interrupted by the depression of the single-character secondary mode switch (not shown). Further special control keys actuate special switches 39 to effect machine printer escapement without printing characters (no print), additional escapement for each character printed (expand), additional escapement for space characters only (space expand), and a word underscore operation.

When it is desirous to underscore the last printed word when in record mode, the operator depresses a special word underscore control key 41 located on the keyboard 13. Depression of this key 41, actuates a special switch 39 which sends a word underscore signal to the system control unit 19 which in turn causes the coded representation of that signal to be stored in the P register 21. The word underscore control logic 43 is responsive to that special coded representation and causes the code to be transferred to the magnetic card reader recorder unit 29 so that it is recorded on the magnetic card medium 207 of FIG. 3, located in the magnetic card reader recorder unit 29. Additionally, the word underscore control logic 43 causes the printer 11 to backspace to the beginning of the last printed word. Thereafter, underscore characters are printed under the previously printed word under the control of the word underscore control logic 43. Just prior to printing the last underscore character, a check is made to determine whether the underscore will precisely fit under the last character of the word. If the last underscore character would overflow into the white space located between words, the printer 11 is backspaced by the amount of overflow and the last underscore character is printed partially over a previously printed underscore character so that it exactly aligns with the last character of the word. Thereafter, system operation as has been described is again initiated.

When the system is in a play mode, recognition of the special word underscore code when it is transferred to the P register 21 from the reader recorder unit 29 automatically effects the word underscore operation in a manner similar to that described above with respect to record mode. Additionally, the word underscore control logic 43 is responsive to a sequence of backspace codes followed by an underscore code to automatically effect a word underscore operation. This latter operation is effective when in play mode only. In this manner, secondary media generated in conjunction with standard spacing printers can be utilized to control proportional spacing printout as well as to effect proper underscoring of words.

As has been described, the printer control unit 25 is responsive to the character located in the P register 21 and responsive to printer escapement to control the amount of printer escapement. The printer control unit 25 is further responsive to the character to be printed to control the impression or velocity setting on the printer. The printer control unit 25 further controls tabulation, indexing, carrier return, shifting from lower case to upper case and print initiation functions.

Escapement and print velocity (impression) are determined when the character to be printed is transferred from the the P register 21 to the escapement and velocity decode unit 47. This unit 47 determines which magnets (the no print magnet and the LVP magnet) will be selected to control the velocity of the printing element of 105 of FIG. 2, when it makes an impression on the document media 49 and activates a corresponding magnet driver in the magnet driver unit 33. Additionally, the escapement and velocity decode unit 47 supplies a value to the escapement register 51 which indicates the printer escapement to be effected after printing the character. The value stored in the escapement register 51 which is proportional to the width of the character located in the P register 21 is then transferred from the escapement register 51 to the escapement counter 53. The escapement counter 53 is thereafter responsive to the escapement of the printer 11 and decrements with each unit of printer escapement. When the escapement counter 53 reaches a value of o, printer escapement is halted.

During a normal print cycle, the character located in the P register 21 is decoded by the escapement and velocity decode unit 47 as described above and further, transferred to the magnet driver unit 23. The printer control unit 25 is responsive to the transmission of the character to energize the cycle clutch magnet (CC magnet) which is physically located in the printer 11. Energization of the cycle clutch magnet causes the character which has been selected by the selected magnet drivers of the magnet driver unit 23 to be printed. During the print cycle, an escapement latch is mechanically tripped to initiate printer escapement. Thereafter, the printer control unit 25 energizes the escapement magnet driver of the magnet driver unit 33 to effect the continuation of printer escapement. The escapement magnet driver unit 33 is then deenergized when the escapement counter 53 is set to 0 thereby causing escapement to halt.

A backspacing operation is initiated when a backspace code is loaded into the P register 21 and subsequently decoded by the printer control unit 25. A standard six unit backspace code is loaded into the escapement counter 53 and a backspace magnet driver of the magnet driver unit 33 is energized to effect backspacing of the printer 11 by six escapement units.

Figure 3:
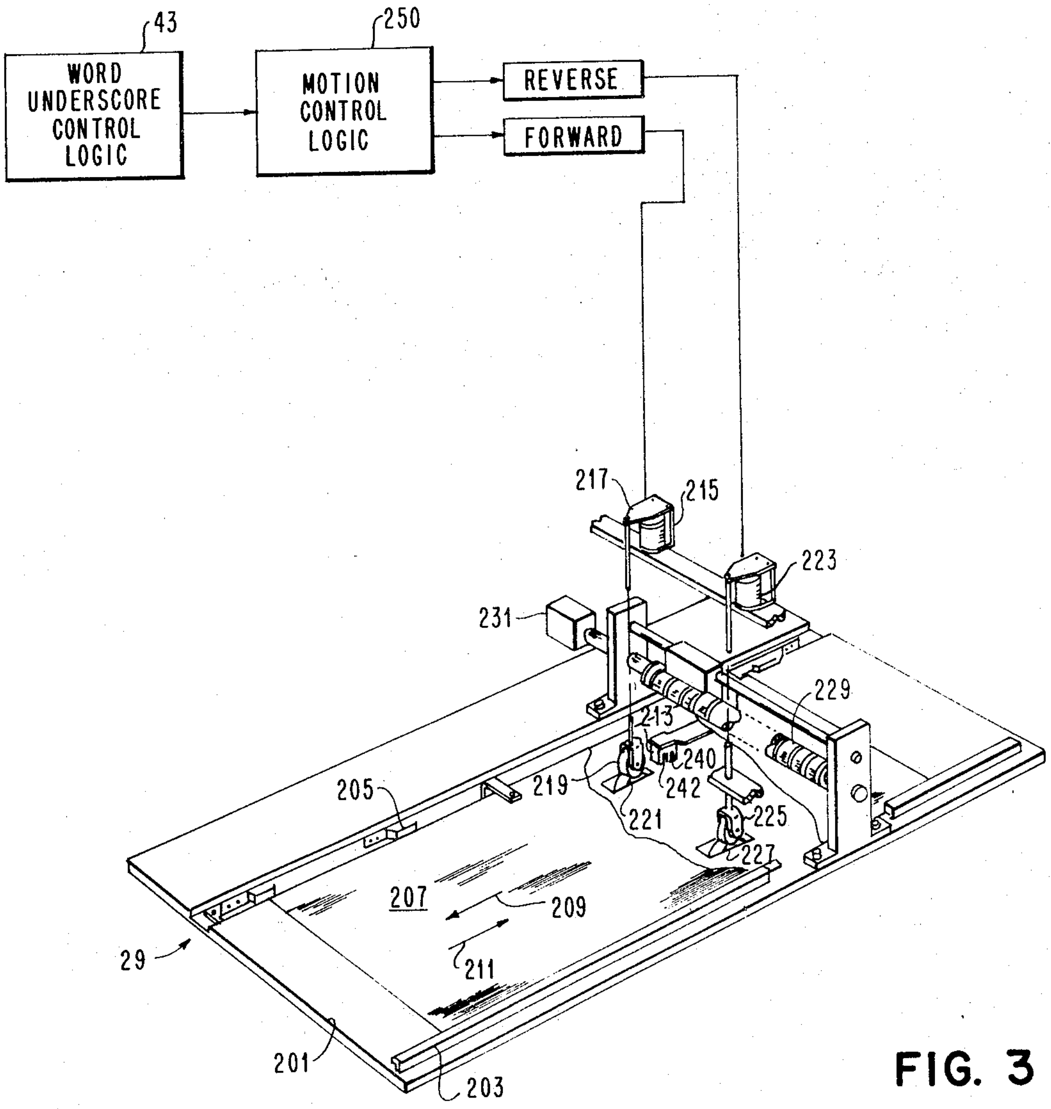
FIG. 3 is a cut away schematic view of a magnetic card reader recorder unit.

When a word underscore code is detected, the characters comprising the previously printed word are sensed from the magnetic card medium 207 of FIG. 3, located in the magnetic card reader recorder unit 29 and transferred serially in reverse order to the P register 21. Each character thus read into the P register 21, is thereafter transferred to the printer control unit 25 which causes the printer 11 to reverse escape by an amount proportional to the escapement decode of the character. When the first or leftmost character of the word has been read and the printer 11 reverse escapes by a corresponding amount, the print point of the printer 11 will be aligned with the first character of the word. Further, as will be described, the magnetic card reader recorder unit 29 will also be aligned to read the first character of the word. Thereafter, under the control of the word underscore control logic 43, each character of the word starting with the first character is read into the P register 21 from the magnetic card medium 207 of FIG. 3, and its escapement value is transferred to the escapement counter 53 and thence to the units counter 55. The word underscore control logic 43 then resets the P register 21 with an underscore code when the value in the units counter 55 exceeds the value of the underscore character (6 escapement units). The units counter 55 thus accumulates escapement values as each character of the word is serially read by the magnetic card reader recorder unit 29 and is decremented by the escapement value of the underscore characters printed. When the escapement value of he last character of the word has been entered into the units counter 55 and an additional escapement less than the escapement of the underscore character remains, the word underscore control logic 43 causes the printer 11 to backspace by an increment corresponding to the difference between the value remaining in the units counter 55 and the escapement value of the underscore character. Thereafter, the last underscore character is printed so that it aligns with the last character of the word.

As has been heretofore described, the printer 11 is responsive to the printer control unit 25 and to the magnet driver unit 23 to effect printing of characters on the document medium 49. The printer 11 provides feedback signals to the printer control unit 25 to indicate the status of the printing operation in progress. These response signals include a print feedback contact signal which indicates that printing has been completed and that the next character may be thereafter sent to the P register 21 for subsequent printing. A print upper case feed back signal indicates that the printer 11 is in upper case. A home signal and a photo remitter signal from the printer lead screw 109 of FIG. 2, indicates printer escapement status to the printer control unit 25.

DETAILED DESCRIPTION

In the description which follows, there will be a detailed explanation of the operation of the printer 11, the magnetic card reader recorder unit 29 and its associated control unit 27, and the word underscore control logic 43 followed by a description of the system operation.

Figure 2:
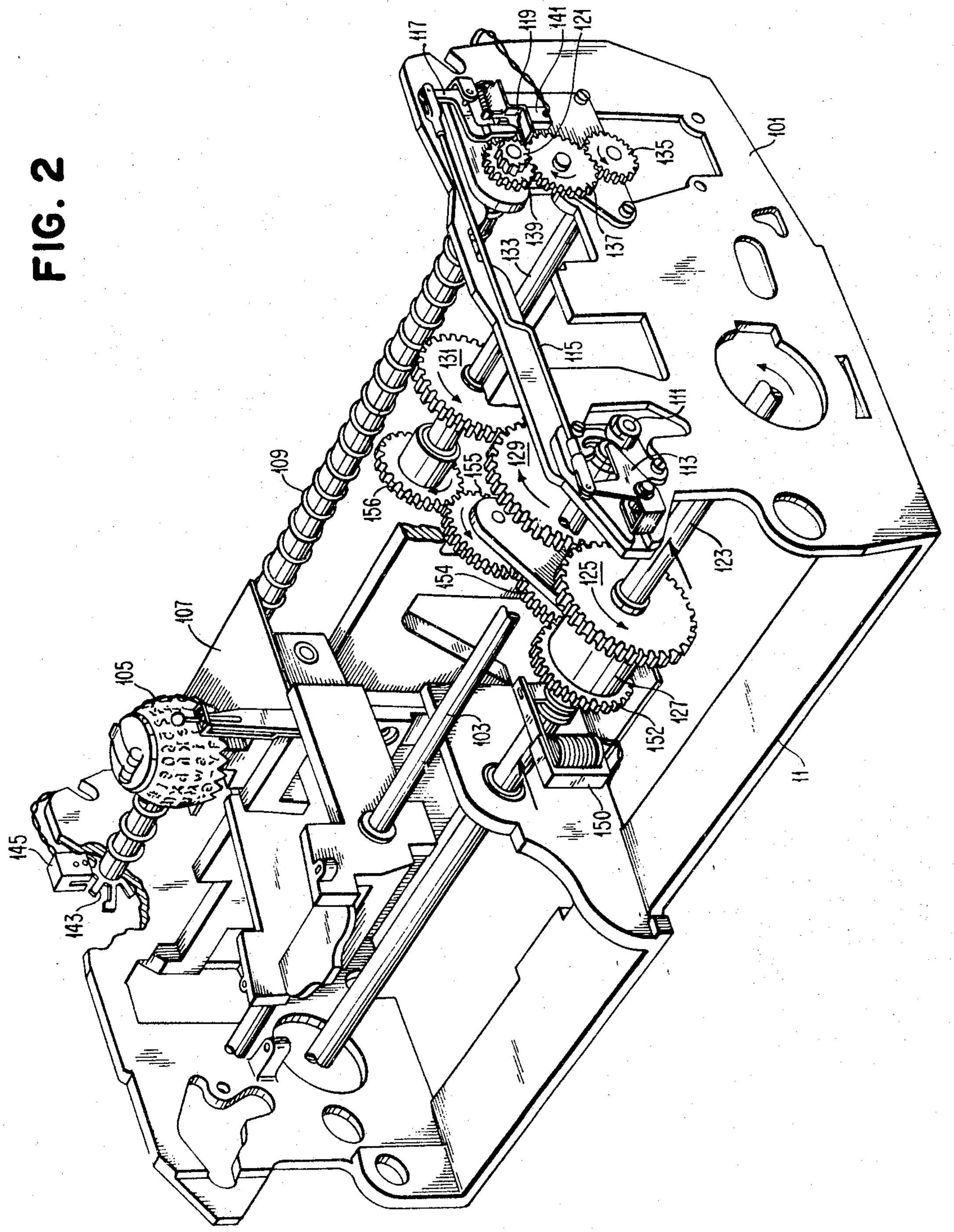
FIG. 2 is a schematic cut away view of a proportional spacing printer.

Referring now to FIG. 2 of the drawing a schematic cut away view of the proportional spacing printer 11 is depicted. The printer 11 comprises a frame 101 on which are mounted the various operational units which effect printing and escapement functions. The printing function is controlled by the print shaft 103 which is caused to rotate when a print cycle is initiated. As the print shaft 103 rotates, the print head 105 is tilted and rotated to a selected character position and is rocked by the print carrier 107 to a printing position. In this manner, the selected character is caused to make an impression on the document medium 49 of FIG. 1. The operation of this portion of the mechanism is identical to the operation of the printer mechanism of the IBM Magnetic Card "Selectric" Typewriter and is similar to the operation of the IBM Selectric typewriter.

Escapement is effected when the print carrier 107 is caused to move in the axial direction of the lead screw 109 upon rotation of the lead screw 109. The lead screw 109 is a 1/6 pitch lead screw and yields a one seventy-second inch per unit of escapement. Escapement is initiated when the print shaft 103 causes the cam 111 to rotate thereby causing the cam follower 113 to move and pull the link 115 to the left. When the link 115 moves to the left the bell crank 117 is rotated thereby moving the pawl 119 from engagement with the pinion 121. Drive power is supplied to the lead screw 109 from the continuously rotating operational shaft 123 which is coupled to gear 125 through a friction clutch 127. The motion is transmitted from the gear 125 to the gear 129 and thence to the gear 131, the shaft 133, and the gear 135. The motion of the gear 135 is transmitted to the gear 137 and thence to the gear 139 which is free to rotate when the pawl 119 is removed from the pinion 121. When the pawl 119 is in place, the friction clutch 127 slips and no motion is transmitted through the gear train 125–139.

Once escapement is started, a signal is supplied from the printer control unit 25 of FIG. 1 to the magnet 141 to hold the pawl 119 out of contact with the pinion 121. As the lead screw 109 thus rotates, the teeth 143 of the photoemitter unit rotate past a photocell light combination (not shown) housed in member 145. As the teeth 143 thus cover the light (not shown) and prevent it from shining on the photocell (not shown) a signal is generated. Each signal thus generated corresponds to one escapement unit. When the printer 11 has escaped a proper number of units as indicated by the photo emitter unit and the escapement counter 53 of the printer control unit 25 of FIG. 1, the signal is removed from the magnet 141 causing the pawl 119 to return against the pinion 121 thereby halting leadscrew 109 rotation and print element 105 escapement.

When it is desirous to cause the printer 11 to reverse escape (back space), the spring clutch 150 is energized thereby connecting the rotational movement of the operational shaft 123 to gear 152. Gear 152 is connected to gear 139 through gears 154, 155, and 156. Since there is an additional gear in the drive train between the operational shaft 123 and the shaft 133 when driving in the reverse direction, reverse motion of the shaft 133 is effected thereby causing the lead screw 109 to rotate in the reverse direction. When the desired number of reverse escapement units have been effected through rotation of the lead screw 109 in the reverse direction as indicated by the signals from the photoemitter unit, the spring clutch 150 is deenergized. When escaping in the reverse direction, the pawl 119 rides over the pinion 121.

Referring now to FIG. 3 of the drawing a cut away schematic view of the magnetic card reader recorder unit 29 of FIG. 1 is depicted. This unit 29 consists of a flat bed plate 201 having a longitudinal guide rail 203 and longitudinal leaf spring guides 205 which effect precise longitudinal positioning of the magnetic card medium 207.

The magnetic card medium 207 is reciprocated in the directions of arrows 209 and 211 under a two gap magnetic head 213. Magnetic card medium motion in the forward or recording direction of arrow 211 is effected by energizing the magnet 215. Energization of this magnet 215 causes the armature assembly 217 to move in a downward direction causing the idler wheel 219 to come into intimate contact with the magnetic card medium 207 forcing the magnetic card medium 207 into contact with the continuously rotating drive roll 221. In a similar manner magnetic card medium 207 motion in the reverse direction of arrow 209 is effected by energizing the magnet 223 causing the idler wheel 225 to force the magnetic card medium 207 against the continuously rotating drive roll 227 which rotates in a direction opposite to that of drive roll 221. The two gap magnetic head 213 is connected to a lead screw 229, rotation of which under control of the clutch 231 causes the two gap magnetic head 213 to align with a different recording track on the magnetic card medium 207.

In order to record data characters, the two gap magnetic head 213 is aligned with a track position on the magnetic card medium 207. Thereafter, the magnetic card medium 207 is caused to be incremented in the forward direction to check a previously recorded character located on that track. Checking is accomplished by sensing the previously recorded character at the read gap 240 and insuring proper bit redundancy and positioning. The magnetic card medium 207 is then moved in a reverse direction unit the previously recorded character is located intermediate the read gap 240 and the write gap 242. Thereafter the magnetic card medium 207 is again moved in the forward direction of arrow 211 and when the first bit of the previously recorded character is sensed at the read gap 240, the first bit of the character to be recorded is gated to the write gap 242. By utilizing the previously recorded character to locate the character to be recorded, precise character positioning is effected. This method of recording characters on a magnetic card medium is described in detail in the aforereferenced copending application of Douglas E. Clancy et al.

When it is desirous to play out data characters which have been previously recorded on the magnetic card medium 207, the two gap magnetic head 213 is placed at the correct track location and the magnetic card medium 107 is thereafter is moved in the forward direction of arrow 211. As the magnetic card medium 207 thus moves in the forward direction, the characters previously recorded are sensed at the read gap 240.

When the word underscore mode is entered upon sensing a previously recorded word underscore code during playout or upon operator depression of the word underscore key 41 of FIG. 1, during a operation, operation the magnetic card medium 207 is caused to be moved in the reverse direction over the recorded word underscore code and over the code representing the last character of the word to be underscored. Thereafter the magnetic card medium 207 is moved in the forward direction so that the last character of the word to be underscored can be sensed and its escapement value utilized to control printer backspacing. Thereafter the magnetic card medium 207 is again incremented in the reverse direction over the just sensed character and the character immediately preceeding it. Thereafter, the latter character is sensed during subsequent forward motion of the magnetic card medium 207. The operation of backing up the magnetic card medium 207 over two characters and reading a character in the forward direction is continued until a word ending code is sensed. Thereafter, as has been described, the characters of the word to be underscored are again played out by incrementing the magnetic card medium 207 in the forward direction of arrow 211 to obtain their escapement value. A special underscore code is then set into the P register 21 of FIG. 1 when a number of escapement units have been accumulated equal to the width of the underscore character. The word underscore control logic 43 of FIG. 1 supplies the necessary signals to the motion control logic 250 which comprises a portion of the magnetic card reader recorder control unit 27 of FIG. 1. The motion control logic 250 is also responsive to normal modes of operation of the device to effect the forward motion of the magnetic card medium 207 when in playout mode and the forward reverse forward motion of the card medium 207 when in record mode.

Referring now to FIG. 4 of the drawing a flow diagram of a portion of the operation of the word underscore control logic 43 of FIG. 1 is depicted. The flow diagram depicts the sequential system operation including the motion of the magnetic card medium 207 of FIG. 3 and the operation of the printer 11 of FIG. 1. Once the system is started in a record or playout mode, a check is made as indicated by block 301 to determine whether a card read or card record operation has been specified. If a card record operation has been specified, the operation proceeds to block 303 and the character entered from the keyboard 13 is decoded and recorded on the card reader/recorder unit 29 of FIG. 1 and FIG. 3, (not shown). As has been described the card medium 207 is incremented in a forward motion, a back or reverse motion and again in a forward motion for the recording operation. This incremental card motion is schematically depicted by block 305. A check is then made of the character keyed and recorded to determine whether it is a word underscore code as indicated by block 307. If the character is not a word underscore code or other special code, it is printed as indicated by block 309 and the operation again proceeds to block 301 awaiting keying of the next character. If the character entered is a word underscore code, the card medium 207 of FIG. 3 is incremented in the forward direction so that the just recorded code can be check read for error as indicated by block 310. If the code was incorrectly recorded on the card medium 207 as indicated by the error detection block 311, the card medium 207 is incremented in the reverse direction over the incorrectly recorded character and over the preceding character. This operation is indicated by block 313. With the card medium 207 thus aligned, the operator may thereafter rekey the word underscore code as indicated by block 315 to effect its correct recording on the card medium 207. If the word underscore code is correctly recorded on the card medium 207, the operation proceeds to block 317 whereupon the card medium 207 is incremented in the reverse direction over two characters and then read in a forward direction. Thus, the character immediately preceding the special word underscore code is read and decoded as indicated by block 317.

When the system is in play mode, the operation proceeds from block 301 to block 319 whereupon the character being played out is read from the magnetic card medium 207 and thereafter decoded as indicated by block 319. The forward card motion during this operation is specified by block 321. If the special word underscore code is detected as indicated by block 323, the operation proceeds to block 317. However, if the word underscore code is not detected, a check is made to determine whether a backspace code has been detected as shown by block 325. If neither a backspace code nor a word underscore code were sensed, the character thus sensed is printed as indicated by block 327 and the next character is read. If the character read is a backspace code, the operation proceeds to special sequential code recognition operation which will be described hereinafter.

Assuming that the special word underscore code has been sensed during a character read operation or had been correctly recorded during a character record operation, the card medium 207 of FIG. 3, is incremented in the reverse direction over two characters and thence in the forward direction to sense the last character of the word to be underscored as indicated by block 317. Providing that the character is correctly detected as indicated by block 329 and that the character sensed is not a word-beginning code as indicated by block 331, the printer 11 of FIG. 1 is backspaced by an escapement value equal to the width of the character sensed as indicated by block 333 and the next character in the word is accessed by backing the card medium 207 over two increments and sensing it in a forward direction as indicated by block 317. This operation continues until a read error is indicated as noted by block 329 or until a word-beginning code is sensed as indicated by block 331. When the word-beginning code is sensed, it indicates that the printer 11 has backed up over the entire word and that the underscoring operation can thereafter be effected. Word-beginning codes include space codes indicating interword spacing, a word underscore code, a backspace code, an underscore code, a tab code, and a carrier return code.

Upon sensing the word beginning code, the operation proceeds to block 341 of FIG. 5 wherein a check is made to determine whether the word beginning code was sensed immediately following the entry into the word underscore operation. In this special case, there is no word to be underscored so the card medium 207 is incremented in the forward direction by one character and the operation proceeds to an exit routine as will be described hereinafter If it is determined that a word is to be underscored, the operation proceeds to block 343 whereupon the first character of the word is read by incrementing the card medium 207 in a forward direction by one character. That character is checked to determine whether a read error exists and if no read error exists as indicated by block 345 and if the character thus sensed is not a word beginning code or a special word underscore code as indicated by block 347, it is decoded for its escapement value as indicated by block 349 and this escapement value is added to the units counter 55 of FIG. 1 as indicated by block 351. A check is then made to determine whether the contents of the units counter 55 is greater than six and, as indicated by block 353, if the value of the units counter 55 is greater than six, an underscore character of six escapement units is printed as indicated by block 355 and the units counter 55 is counted down by six units as indicated by block 357. A further check is made to insure that the value in the units counter 55 is not greater than six and, if is is not the next character of the word is read as indicated by block 343. This operation proceeds until the special underscore code is detected or until a word-beginning code is detected thereby indicating that the last character of the word has been read and its escapement value has been entered into the units counter 55. At this time, the operation proceeds from block 347 to block 361 whereupon a check is made to determine whether the contents of the units counter 55 is equal to 0 . The contents of the units counter 55 is equal to 0 when the last underscore character printed exactly aligns with the last character of the word to be underscored. If, however, a remaining portion of the last character does not have an underscore thereunder, the units counter 55 will have a non zero value remaining therein. In this case, the operation proceeds from block 361 to block 363 whereupon the number of remaining escapement units of the last character of the word to be underscored is calculated. The printer 11 is then backspaced as indicated by block 365 by a corresponding amount and the last underscore character is printed as indicated by block 367 to precisely align with the last character of the word.

Once the word has been completely underscored by the printing of the last underscore character, the operation proceeds to block 371 whereupon a check is made to determine whether the operation was entered upon by the recording and/or sensing of special word underscore code or upon the recognition of a backspace-underscore code sequence. Assuming that it was entered by the recognition of the special word underscore code, the operation proceeds to block 373 whereupon a check is made to determine whether the system is in a read or record mode. If the system is in a read or play mode, it will be recalled that the special word underscore code would have been sensed as indicated by block 347. Thus, the next character is thereafter read when the operation proceeds directly to block in 301 of FIG. 4. If the system is in record mode, it is necessary to back the card medium 207 of FIG. 3 up by one character so that the word underscore code may be thereafter sensed to precisely align the next character to be recorded. This operation is indicated by block 375.

AS has been previously described, a word underscore operation can be initiated upon sensing a sequence of codes indicating that a preceding word is to be underscored. For example, if text were printed on a standard spacing printer and if the keyed characters thus printed were recorded on a magnetic medium, a word underscore operation would be effected by depressing the backspace key on the standard spacing printer a number of times equal to the number of characters in the word to be underscored. Thereafter, the underscore key would be struck a number of times corresponding to the number of characters in the word. The printer would thus be caused to print the desired word, to be backspaced over the word, and to thereafter print underscore characters under the word. The magnetic medium which sequentially captures the keystrokes would thus contain coded characters indicative of the characters of the word followed by a series of backspace codes in turn followed by a series of underscore codes. Such a standard-spacing printer system could be one similar to that described in the afore referenced copending application of Robert A. Kolpek. The special sequential logic of the system of the present invention recognizes such a sequence of codes as an instruction to perform a word underscore operation. Thus, card media generated in conjunction with a standard-spacing printer can be utilized to effect proportional spacing printout and words which have been underscored remain underscored during the proportionally spaced printout.

Referring now to FIG. 6 of the drawing when a backspace code has been read during playout mode, the next character located on the card medium following the backspace code is sensed by causing the card medium 207 to increment in a forward direction as denoted by blocks 381 and 383. If the next character thus accessed is accessed correctly as indicated by block 384 and is a backspace code as indicated by block 385, The operation proceeds to read the next subsequent character. This operation continues until the next code accessed is not a backspace code at which time a test is made as indicated by block 387 to determine whether it is an underscore code.

If an underscore code is not detected as indicated by block 387 as the first character following a backspace code or series of backspace codes, the L1 indicator is set as noted by block 389. This L1 indicator is utilized to indicate to the system that a word underscore operation has not been specified and that various backspace codes have been read without printer execution thereof. The L1 indicator is not set if an underscore code immediately follows the last backspace code. Once a character other than a backspace character is sensed, the operation proceeds to block 391 and block 393 whereupon the card medium 207 of FIG. 3 is incremented in the reverse direction so that two characters pass the read gap 240 of FIG. 3 and the last character is sensed by then moving the card medium 207 in the forward direction. The first character thus sensed if sensed correctly as indicated by block 394 will be the last backspace code recorded and the operation will proceed from block 395 back to block 391. This operation continues until a nonbackspace character is sensed. The operation then proceeds from block 395 to block 397 whereupon a test is made to determine whether a word underscore operation may have been specified. If the L1 indicator is set indicating that an underscore code has not been detected or if the character preceding the first backspace code is a word beginning code, the operation proceeds to block 398 to reset the L1 indicator and thence to block 399 whereupon the card medium 207 is incremented in the forward direction and the first backspace code is sensed. The printer 11 is then caused to backspace by a fixed six unit backspace as indicated by block 401. Each subsequent backspace code is thus sensed and the printer 11 is caused to backspace. When the first nonbackspace code is sensed as indicated by block 402 the operation proceeds to block 403 whereupon that character is printed.

When an underscore code has been detected following a sequence of backspace codes and when the character immediately preceding the first backspace code is not a word beginning code, a word underscore operation is specified and the system operation proceeds from block 405 of FIG. 6 to block 407 of FIG. 4. Referring once again to FIG. 4 of the drawing, the L2 indicator is set as indicated by block 407 thereby indicating to the system that a word underscore operation has been entered by sensing a sequence of backspace and underscore codes. Since a character has just been sensed which was the last character of the word to be underscored, the printer 11 is backspaced by an escapement value corresponding to the sensed character as indicated by block 333. Thereafter the operation proceeds in the same manner as that described heretofore when a special word underscore code is sensed. That is, the printer 11 is backed up over the word to be underscored and thereafter, underscore characters are printed under the word to be underscored. Referring once again to FIG. 5 of the drawing, when the last underscore character has been printed as indicated by block 367, a check is made to determine whether the L2 indicator had been set as indicated by block 371. If the L2 indicator is set, there will be a sequence of backspace and underscore codes which should be ignored during subsequent printout Thus, the operation proceeds from block 371 to block 409 whereupon the L2 indicator is reset. Thereafter, the card medium 207 is incremented in the forward direction as indicated by block 411 and if the character thus sensed is a backspace or underscore code, as indicated by block 413, the next sequential character is sensed. The operation continues until a character other than a backspace or underscore character is sensed. The printer then prints the nonbackspace or nonunderscore character as indicated by block 414 and the operation proceeds to read the next character.

As has been described, special error procedures are utilized to aid the operator in using the system and to eliminate operator confusion. Thus, when a read error occurs when the characters of the word to be underscored are being sensed in order to determine their escapement value to thereby control the printing of the underscore character as indicated by block 345 of FIG. 5, the units counter 55 of FIG. 1, is incremented by six units as indicated by block 420 instead of by an amount equal to the escapement value of the misread character of the word. Thus, if the character which was incorrectly sensed is not equal to six escapement units, the underscore will slightly misalign with the last character of the word. However, the operator would receive no indication of an error. Six escapement units of spacing was chosen since most characters in a proportional set weighted from four escapement units to nine escapement units as utilized in the present embodiment have an escapement value of six. Further, six is also intermediate the values of four and nine.

Referring once again to FIG. 4 of the drawing, when a read error is detected as indicated by block 329 when the printer 11 is backspacing, the operation proceeds directly to block 341 of FIG. 5 whereupon those characters of the word which were correctly sensed are underscored. This operation prevents an underscore character from being placed adjacent to an incorrectly sensed interword space and perhaps a preceding word. However, due to this operation, only a portion of the word may be underscored. Again, the operator is not alerted to a special error condition. If only a portion of the word is underscored during such playout, the operator can place the system in a print only mode and print underscore characters under the word incorrectly sensed.

Referring once again to FIG. 1 of the drawing, the description immediately preceding has related to the sequential operation of the system and more particularly to the sequential operation of the word underscore control logic 43 as it relates to the operation of the printer 11 and the magnetic card reader recorder 29. In the description which immediately follows, the detailed logic of the system which makes up the word underscore control logic 43, a portion of the system control unit 19, the printer control unit 25 and the magnetic card reader recorder control unit 27 will be described.

Referring now to FIG. 7 of the drawing, a schematic block diagram representation of a portion of the word underscore control logic 43 of FIG. 1 is depicted. This logic 43 consists of a plurality of control latches and their associated gating circuits which sequence the system operation heretofore described. The word underscore code latch 501 is set upon the detection of a word underscore code with a signal from AND-gate 502. As will be described hereinafter, setting this latch 501 causes the card reader recorder unit 29 of FIG. 1 and FIG. 3 to effect a card medium back-back-forward motion. The word underscore code latch 501 is reset when a character other than a word underscore code is sensed and the printer backspace latch 503 is then set under control of a signal from AND-gate **504*a* and OR-gate 504*b*. Setting of the printer backspace latch 503 causes the card medium 207 of FIG. 3 to move in a back-back-forward motion and further causes the printer 11 to reverse escape by an amount proportional to the escapement value of the character detected during the forward portion of the medium motion. The printer backspace latch 503 is reset and the word underscore latch 505 is set when a word beginning code is sensed or if an error is sensed as indicated by a signal from OR-gate 506. Under control of this latch 503 the card medium 207 is incremented in the forward direction and each character is sequentially sensed. Additionally, the printer 11 is performing a word underscore operation by printing underscore characters under the characters of the word to be underscored. When the last character of the word to be underscored has been sensed and a portion of an underscore character remains to be printed, the word underscore latch 505 is reset and the word end latch 507 is set under control of a signal supplied by OR-gate 508*a*. Under the control of the word end latch 507, the printer 11 is backspaced so that the last underscore character printed will exactly align with the last character of the word and the latch 507 is then reset under control of a signal supplied by OR-gate 508*b***.

As has been described heretofore, a word underscore operation can be initiated upon the sensing of a sequence of backspace and underscore codes. The read backspace latch 509 is set with a signal from AND-gate 510 when the first backspace code in such a sequence is read. Setting of this latch 509 causes the card medium 207 to be incremented in the forward direction so that the characters following the backspace code can be sensed. The first nonbackspace character sets either the underscore found latch 511 under control of AND-gate 512 or the underscore not found latch 513 under control of AND-gate 514 in accordance with whether the code thus detected is an underscore code or is not an underscore code. In either case, the card medium 207 is incremented in a back-back-forward direction to get to the character immediately preceding the first backspace code. If an underscore character has been found following a sequence of backspace codes and if the character immediately preceding the backspace code was not a word-beginning code, gate 515 supplies a signal through OR-gate **504*b* which sets the printer backspace latch 503. Thereafter, the printer 11 backspaces and the word underscore and word end operation follow as heretofore described with respect to the sensing of a special word underscore code. The skip latch 517 is set with a signal from AND-gate 518 upon sensing the special word underscore code or upon sensing a backspace code after the last character of the word has been underscored. This latch 517 controls the card medium 207 so that it is moved in a forward direction without causing a corresponding printer operation for the characters sensed. The skip latch 517 is reset when a nonbackspace, nonunderscore character is sensed. The output of the skip latch 517 further is utilized to inhibit the setting of the read backspace latch 509 or the word underscore code latch 501** thereby preventing the system form locking into a loop.

The DO-latch 519 is set when a backspace code or a sequence of backspace codes followed by a nonunderscore character is detected as indicated by AND-gate 520 or when the first backspace code follows a word beginning code as indicated by AND-gate 521. The DO-latch 519 is also set when a special word underscore code has been detected and when there is no word immediately preceding the special word underscore code as indicated by AND-gate 522. The DO-latch 519 controls the motion of the card medium 207 so that it moves in a forward direction. When backspace codes are sensed after the DO-latch 519 is set, a six unit backspace is effected by the system.

Referring now to FIG. 8 of the drawing, the logic gates which effect card medium motion and printer escapement are depicted. The card medium 207 is incremented in the forward direction under the control of OR-gate 525 and OR-gate 526 when the word underscore latch 505, the skip latch 517, the DO-latch 519, or the read backspace 509 of FIG. 7 has been set. Additionally, when the operator keys an underscore code when in record mode, the AND-gate 527 provides a signal causing the medium 207 to be incremented in the forward direction so that the word underscore control code can be error checked. The card medium 207 is also incremented in a forward direction when in play or read mode and when the various word underscore control latches of FIG. 7 are not set as indicated by AND-gate 529. The card medium 207 is incremented in a forward-back-forward direction when in record mode and a character is keyed. This motion is controlled by the AND-gate 531. Card motion in a back-back-forward direction is effected under the control of OR-gate 533 which is responsive to the underscore found latch 511, the underscore not found 513, the word underscore code latch 501 and the print backspace latch 503. The card medium 207 is moved in the reverse direction under the control of OR-gate 535 which in turn is responsive to AND-gates 537 and 539. AND-gate 537 provides an output signal when a word underscore control code has been recorded following an interword code. AND-gate 539 provides an output signal when in record mode and when the underscore has been completely printed in order to correctly align the reader recorder unit 29 of FIG. 1, for a subsequent record cycle. AND-gate 541 provides an output signal to cause the card medium 207 to move in the backward direction over two characters when a word underscore code is incorrectly recorded on the card medium 207. A print signal is provided by OR-gate 543 whenever a character code is read and when the various word underscore control latches of FIG. 7 are not set as indicated by a signal from AND-gate **554*a*, or when a character code is recorded which is not a backspace character or a word underscore control character as indicated by a signal from AND-gate 544*b*. Additionally, a print signal is provided when the P register 21 of FIG. 1 is reset with an underscore code as will be described hereinafter. OR-gate 545 provides an output signal causing the printer 11 to reverse escape. The printer 11 is reverse escaped when the DO-latch 519 has been set and a backspace code is thereafter sensed as indicated by a signal from AND-gate 546. Additionally, the printer 11 is reverse escaped during a word end operation to properly align the last underscore character with the last character of the word as indicated by a signal from AND-gate 547. The printer 11 is also backspaced when the print backspace latch 503** is set.

Referring now to FIG. 9 of drawing, the system logic which maintains count of the escapement of the word to be underscored and which effects the printing of an underscore character is depicted. A print cycle is effected by a signal from OR-gate 600, when a character is entered into the P register 21 from the keyboard 13 or from the card reader recorder unit 29 of FIG. 1; during a card forward motion or during a card back-back-forward motion. The character thus entered into the P register 21 is then decoded by the escapement decode unit 47 and this escapement value is entered into the escapement counter 53 under the control of AND-gate 601. The AND-gate 601 is also responsive to the OR-gate 603 which is responsive to the AND-gate 605. AND-gate 605 provides an output signal whenever the print or backspace signal is supplied from the logic depicted in FIG. 8 of the drawing and when the word end latch 507 is not set. Additionally, the OR-gate 603 is responsive to the AND-gate 607 which is in turn responsive to OR-gate 608 to provide an output signal during a word underscore operation when the card medium is moving in the forward direction during the actual underscore operation. The escapement counter 53 is decremented by emitter pulses when the backspace or print signal is supplied to the AND-gate 609 which in turn provides an output decrement signal to the OR-gate 611. Additionally, the escapement counter 53 is decremented when its value is transferred to the units counter 55 under the control of AND-gate 613 which is in turn responsive to a constant clock signal and to a counter transfer signal.

The units counter 55 is incremented with a clock pulse under the control of AND-gate 620, AND-gate 621 and OR-gate 622 when the word underscore latch 505 is set and when the card medium 207 is in a forward motion. Thus, the value in the escapement counter 53 is transferred to the units counter 55. When the value in the escapement counter 53 equals 0 as indicated by the escapement decode 623, the AND-gate 621 no longer provides a signal to count the units counter 55 up. The units counter 55 also counts up under control of a signal supplied by AND-gate 624 and OR-gate 622 with each emitter pulse when the printer 11 is backspaced under the control of the word end latch 507 until it reaches a count of six corresponding to the escapement of the last underscore character to be printed. The units counter 55 is decremented in a word underscore operation with each emitter pulse representing the escapement of the printer 11 under control of OR-gate 625 and AND-gate 626. A counter decode unit 627 provides an output signal indicating when the units counter 55 has accumulated a count greater than six, equal to six, or equal to zero. This signal is utilized to control the printing of an underscore character. An underscore character is printed whenever the counter value is greater than six during a word underscore operation. When this condition is met, the AND-gate 629 provides an output signal to the OR-gate 631 which resets the P register 21. Since the underscore code in the embodiment described corresponds to a P register reset condition, an underscore character is selected and printed. Additionally, as has been described, underscore codes are printed when an error is detected during a word underscore operation. AND-gate 633 provides an output signal to effect the printing of this underscore character. Additionally, during a word end operation, when the units counter 55 attains a count of six an underscore is printed as controlled by the AND-gate 635. The character decode 639 is responsive to the output of the P register 21 to indicate a word underscore code, a backspace code, or a word-beginning code to the system logic depicted in FIGS. 7 through 9.

OPERATION

Referring once again to FIG. 1 of the drawing, a word underscore operation can be initiated by the operator when in record mode by depressing a word underscore keybutton 41 located on the keyboard 13 of the printer 11. Additionally, a word underscore operation can be initiated when the printer 11 is in play mode by the sensing of a special word underscore code located on a magnetic card medium 207 of FIG. 3 which in turn is located within the magnetic card reader recorder unit 29. When this special code is recognized or when a sequence of backspace codes followed by an underscore code is recognized, the word underscore control logic 43 causes the magnetic card medium 207 to be incremented in a reverse direction over the codes of the last word recorded or played out. Simultaneously, as each character is sensed, the printer 11 is backspaced by an amount corresponding to the width value of the character sensed. A special emitter located within the printer 11 provides a photoemitter signal to the integrator 31 which in turn provides a signal to the printer control unit 25 to effect the proper amount of reverse escapement. When a word-beginning code is detected indicating that all of the characters of the word to be underscored have been sensed and that the printer 11 has reverse escaped over these characters, the word underscore control logic 43 causes each character of the word to be underscored to be sequentially read from the card medium 207. As each character is thus read, its escapement value is transferred to the escapement counter 53 and thence to the units counter 55. When the value stored in the units counter 55 exceeds the escapement value of the underscore character, an underscore character is printed. After the last character of the word to be underscored has been sensed, and if the units counter 55 contains a value less than the escapement of an underscore character, the word underscore control logic 43 causes the printer control unit 25 to effect reverse escapement of the printer 11 by the proper amount so that the last underscore character printed will precisely align with the last character of the word. Thereafter, the normal playout or record operation proceeds.

As is appreciated by those skilled in the art, various logic techniques could be utilized to effect the word underscore operation without departing from the spirit and scope of the present invention. For example, the escapement count of each word could be stored in an accumulator or other storage device during a playout or record operation and this count could thereafter be utilized to control the backing up or reverse escapement of the printer 11 and its subsequent playout when printing underscore characters. That is, if the escapement of each word were retained temporarily in storage, the printer 11 could thereafter be reverse escaped by a corresponding amount and word underscore characters could thereafter be printed and the stored escapement value decremented until it was less than the escapement of the word underscore character. Thereafter, reverse printer escapement and printing of the final word underscore code could be effected. Additionally, while the operation of printing underscore characters has been described, it is of course, recognized by those skilled in the art that overscore characters or the like could be printed in lieu of underscore characters so as to overstrike a previously printed word with the predetermined character.

A proportional spacing typewriter system has been described wherein the keyboard 13 was electronically connected to a mechanical single element printer 11 and wherein a magnetic card medium 207 was utilized to record and control printer operations. As is recognized by those skilled in the art, the present invention could be incorporated on any serial printer which effects proportional printing and which operates in response to any serial input device which supplies electrically or mechanically coded signals including, but not limited to a mechanically connected keyboard, magnetic tape, paper tape, punch cards, optical character recognition devices, magnetic character recognition devices, core storage, or combinations of the above.

Further, a proportional spacing printer 11 has been described wherein the character set was weighted from a minimum of four escapement units to a maximum of nine escapement units. Any other proportionally weighted character set could be utilized, it being understood that the great majority of the characters in a given character set must be assigned an escapement increment that is proportional to the width of the corresponding character representation.

Additionally, while words of data character codes have been defined as those data character codes located between one or more of the following codes: space code, backspace code, underscore code, tab code, carrier return code, and word underscore code, additional codes including certain character codes could also be utilized to define words of data character codes to be underscored.

While this invention has been particularly shown and described with reference to a preferred embodiment thereof, it should be understood by those skilled in the art that the foregoing and other changes in form and detail may be made therein without departing from the spirit and scope of the invention.

What is claimed is:

1. A proportional spacing serial printer system comprising:

serial input means for supplying a serial stream of coded character representations to be printed and control functions to be executed;

escapement control means responsive to coded character representations in said serial stream for defining an escapement increment for each coded character representation proportional to the width of a corresponding character symbol representation;

determining means responsive to said escapement control means for determining the escapement increment of a word of adjacent coded character representations in said serial stream;

word backspace control means responsive to a predetermined coded control function in said serial stream for supplying a reverse escape control signal;

a proportional spacing serial printer comprising a printing means responsive to said serial stream of coded character representations for sequentially printing character symbol representations corresponding to each symbol character representation on a document medium, escapement means responsive to said escapement control means for effecting relative motion between the printing means and the document in a first printing direction after each character symbol representation has been printed by said printing means, the relative distance travelled corresponding to the escapement increment defined by the escapement control means, reverse escapement control means responsive to said reverse escape control signals and to said determining means for effecting relative motion between the printing means and the document in a second direction opposite said first direction over a previously printed word the relative distance travelled corresponding to the escapement increment defined by the determining means; and overstrike means responsive to the completion of said relative motion in said second direction for supplying a number of a preselected character representation code to said serial stream, said number of codes supplied corresponding to the number of the corresponding character symbol representation required to place at least one such character symbol representation adjacent each character symbol representation of said previously printed word.

2. The proportional spacing serial printer system set forth in claim 1 further comprising:

accumulating means responsive to the overstrike means for accumulating an escapement value of said number of codes supplied by the overstrike means, said value of said supplied code being determined prior to said code being placed in said serial data stream;

compare means responsive to said accumulating means and to said determining means for providing an output signal when the value of said accumulating means exceeds the determined escapement increment and for defining the difference value between said value and said increment;

said reverse escapement control means being responsive to said compare means for effecting relative motion between the printing means and the document medium in said second direction, the relative distance travelled corresponding to the difference value defined by the compare means;

said printing means being responsive to said compare means and to said reverse escapement control means for printing the character symbol representation corresponding to the last supplied preselected character code after the completion of said relative motion in said second direction.

3. The proportional spacing serial printer system set forth in claim 1 further comprising:

sequence recognition logic means responsive to said serial stream for recognizing a sequence of backspace function codes followed by at least one predetermined character code in said serial stream and for supplying a reverse escape control signal in response thereto.

4. The proportional spacing serial printer system set forth in claim 3 further comprising:

backspace control means responsive to said serial stream for recognizing a sequence of backspace function codes followed by a nonpredetermined character code in said serial stream for defining a number of fixed escapement increments corresponding to the number of backspace function codes in said sequence;

said reverse escapement control means being responsive to said backspace control means for effecting relative motion between the printing means and the document medium in said second direction, the relative distance travelled corresponding to the fixed escapement increment times the number of said increments defined by said backspace control means.

5. The proportional spacing serial printer system set forth in claim 1 wherein:

said serial input means is responsive to said reverse escape control signal to supply a previously supplied sequence of coded character representations and control functions to be executed in reverse sequence;

said printing means is responsive to said reverse escape control signal to inhibit printing of coded character representations thereafter supplied by said serial input means;

said determining means being responsive to said reverse escape control signal and to said serial input means for determining the sequentially presented coded character representation corresponding to the first character of a word of characters and for providing a halting signal in response thereto for halting said input means;

said reverse escapement control means being further responsive to said escapement control means, said relative distance travelled corresponding to the sum of escapement increments defined by said escapement control means for each of said previously supplied coded character representation.

6. The proportional spacing serial printer system set forth in claim 5 further comprising:

error detection means responsive to said serial input means for supplying an error signal for each incorrectly supplied coded character representation;

said determining means being responsive to said error signal for providing said halting signal.

* * * * *